(12) United States Patent
Chao et al.

(10) Patent No.: US 7,166,207 B2
(45) Date of Patent: Jan. 23, 2007

(54) NON-MECHANICAL METHOD OF REMOVING MATERIAL FROM THE SURFACE OF A GOLF CLUB HEAD

(75) Inventors: Bing-Ling Chao, San Diego, CA (US); Stephen A. Kraus, San Diego, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 435 days.

(21) Appl. No.: 10/302,332

(22) Filed: Nov. 22, 2002

(65) Prior Publication Data

US 2004/0099538 A1 May 27, 2004

(51) Int. Cl.
- C25F 3/00 (2006.01)
- C25F 3/02 (2006.01)
- C30F 3/00 (2006.01)

(52) U.S. Cl. ............. 205/640; 205/666; 205/668; 205/687; 205/705; 205/710; 205/717

(58) Field of Classification Search ............. 205/640, 205/666, 668, 687, 705, 710, 717; 423/324, 423/330, 342, 409

See application file for complete search history.

(56) References Cited

U.S. PATENT DOCUMENTS

| | | | |
|---|---|---|---|
| 3,803,108 A | 4/1974 | Andrews | 204/290 R |
| 4,964,641 A | 10/1990 | Miesch et al. | 273/175 |
| 6,059,670 A | 5/2000 | Mogan | 473/342 |
| 6,093,113 A * | 7/2000 | Mertens | 473/328 |
| 6,198,066 B1 | 3/2001 | Thorne | 219/121.17 |
| 6,200,439 B1 | 3/2001 | Wei et al. | 204/284 |
| 6,381,828 B1 | 5/2002 | Boyce et al. | 29/527.4 |
| 6,855,634 B1 * | 2/2005 | Sato et al. | 438/692 |
| 2002/0142861 A1 | 10/2002 | Helmstetter et al. | 473/342 |
| 2004/0195090 A1 * | 10/2004 | Omasa | 204/273 |

FOREIGN PATENT DOCUMENTS

JP  10305117 A  * 11/1998

OTHER PUBLICATIONS

Van Horn, "Pulse Plating", Dynatronix (Aug. 5, 1999), pp. 1-13.*

* cited by examiner

*Primary Examiner*—Edna Wong
(74) *Attorney, Agent, or Firm*—Sheppard, Mullin, Richter & Hampton LLP (57) ABSTRACT

A highly accurate, efficient, and non-mechanical method of removing material from the surface of a golf club head using the principles of electrolysis. The process generally includes positioning at least one electrode in close proximity to a portion of a rear surface of a striking plate, flowing a liquid containing an electrolyte between the rear surface portion and the electrode, and applying a low voltage between the rear surface portion and the electrode. The electrode has an overall negative charge and the golf club head has an overall positive charge, such that a pulsed high-density DC current passes between the electrode and the rear surface portion. This results in negatively charged electrolytes in the liquid attracting positively charged molecules of the rear surface portion, such that the designated amount of material from the rear surface portion is removed by electro-chemical oxidation and carried away by the liquid flow.

5 Claims, 10 Drawing Sheets

NON-MECHANICAL METHOD OF REMOVING MATERIAL FROM THE SURFACE OF A GOLF CLUB HEAD

BACKGROUND OF THE INVENTION

The present invention relates generally to methods for producing golf club heads and, more particularly, to an improved non-mechanical method for producing a golf club head.

Modern golf clubs have typically been classified as woods, irons or putters. Additionally, a newer class of golf clubs termed "utility" clubs or "iron woods," seek to replace low-lofted long irons or higher numbered fairway woods. The term "wood" is a historical term that is still commonly used, even for golf clubs that are constructed of steel, titanium, fiberglass and other more exotic materials, to name a few. The woods are now often referred to as "metal woods." The term "iron" is also a historical term that is still commonly used, even though those clubs are not typically constructed of iron, but are rather constructed of many of the same materials used to construct "woods."

One particular improvement that relates especially to metal woods is the use of lighter and stronger metals, such as titanium. A significant number of the premium metal woods, especially drivers, are now constructed primarily using titanium. The use of titanium and other lightweight, strong metals has made it possible to create metal woods of ever-increasing sizes. The size of metal woods, especially drivers, is often referred to in terms of volume. For instance, current drivers may have a volume of 300 cubic centimeters (cc) or more. Oversized metal woods generally provide a larger sweet spot and a higher inertia, which provides greater forgiveness than a golf club having a conventional head size.

One advantage derived from the use of lighter and stronger metals is the ability to make thinner walls, including the striking face and all other walls of the metal wood club. This allows designers more leeway in the positioning of weights. For instance, to promote forgiveness, designers may move the weight to the periphery of the metal wood head and backwards from the face. As mentioned above, such weighting generally results in a higher inertia, which results in less twisting due to off-center hits. One disadvantage derived from the use of stronger materials is the increased difficulty of mechanically manipulating and machining them.

There are limitations on how large a golf club head can be manufactured, which is a function of several parameters, including the material, the weight of the club head, the strength of the club head, and the materials used. Additionally, to avoid increasing weight, as the head becomes larger, the thickness of the walls must be made thinner, including that of the striking face. As a result, as the striking face becomes thinner, it has a tendency to deflect more and more at impact, and thereby has the potential to impart more energy to the ball. This phenomenon is generally referred to as the "trampoline effect." A properly constructed club having a thin face can therefore impart a higher initial velocity to a golf ball than can a club having a rigid thick face. Because initial velocity is an important factor in determining how far a golf ball travels, this is very important to golfers.

It is appreciated by those skilled in the art that the initial velocity imparted to a golf ball by a thin-faced metal wood varies depending on the location of the point of impact of a golf ball on the striking face. Generally, balls struck in the sweet spot will have a higher rebound velocity. Many factors contribute to the location of the sweet spot, including the location of the center of gravity (CG) and the shape and thickness of the striking face.

Prior golf club heads have provided an increased initial or launch velocity of a golf ball, by incorporating a lightweight, flexible face. Manufacturers of metal wood golf club heads have more recently attempted to manipulate the performance of their club heads by designing what is generically termed a variable face thickness profile for the striking face, and in particular, with the use of lightweight materials, such as titanium alloys. Golf club heads with striking faces that incorporate a complex design (e.g., a variable thickness profile) and golf club heads that are made out of a very strong materials (e.g., titanium alloys) are very difficult to manufacture using mechanical methods. Typically, mechanical methods of machining cannot produce golf club heads incorporating complex shapes and designs. Attempts to create golf club heads with complex shapes and designs using mechanical methods typically result in the golf club heads having poor quality. Additionally, the stronger base materials make it even more difficult and time consuming to mechanically manipulate the materials into a superior quality golf club head.

Numerous golf club heads with complex or irregular surfaces have been designed and created. By way of example only, some of them include using ribs formed on the back of a club face, one or more thin rings, a power bar and a cone formation. Multiple thin rings have been attached by various means so as to add mass directly behind the sweet spot, and alternatively a spiral formation has been used, wherein the multiple rings or spiral mass extend from the sweet spot substantially toward the periphery of the face plate. A single thin ring at the sweet spot has been used on an iron club head in conjunction with an added toe mass in order to reposition a point of least rigidity to the center of the face.

Generally, as time goes on, golf club heads incorporate surfaces with increasingly complex and irregular shapes. Additionally, golf club heads tend to be manufactured from stronger and stronger materials. Strong base materials and complex and irregular surfaces are used to provide certain desired advantages to the golfer (e.g., larger sweet spot, increased coefficient of restitution). To provide golfers with these desired advantages, frequently, the surfaces of these new golf club heads must be made with extreme precision and to exacting standards.

Unfortunately, conventional mechanical methods (e.g., milling or forging) of producing golf club heads have many economic and technical drawbacks. As mentioned above, there is a general trend toward using stronger and stronger base materials in golf club heads. Because of their strength, these base materials are more difficult to machine using traditional mechanical methods. They require more time to manipulate into the proper form and wear down the components of a mechanical machining process in less time, requiring additional re-tooling. Therefore, additional costs are incurred and delays are experienced when stronger materials are mechanically machined. Mechanical methods of machining strong materials can also create extreme temperatures and residual stresses that have an undesirable effect on these materials. Additionally, materials that are highly flexible or slender are difficult to cut or clamp and are therefore difficult to machine using mechanical methods.

Another drawback to using mechanical methods to produce golf club heads is the difficulty of producing complex or irregular surfaces having superior quality. Generally, the mechanical machining methods used today cannot form golf club heads having highly complex or irregular surfaces with superior quality. This is especially true when the golf club head is made of a very strong material.

The foregoing discussion demonstrates that there exists the need for a more accurate, efficient and cost-effective method for producing golf club heads that produces superior quality regardless of the materials used or complexity of the design.

SUMMARY OF THE INVENTION

The present invention provides a highly accurate, efficient and non-mechanical method for producing golf club heads, using the principles of electrolysis. The present invention allows golf club heads made out of very strong materials, and golf club heads with complex or irregular surfaces, to be made efficiently and with superior quality. In a preferred form, this is accomplished using an electrode, typically a cathode, positioned close to the surface of the golf club head, in regions where material of the golf club head is to be removed. A non-conductive template is shaped to contact the surface of the golf club head only where the material of the golf club head is not to be removed. The non-conductive template is placed in connection with the surface of specific areas of the golf club head to prevent the removal of the material of the golf club head from those areas.

A power supply provides a low-voltage, high-density dc current that is passed between the electrode and the surface of the golf club head in regions where the material is being removed by an electrolyte. The material of the golf club head is removed by electrochemical oxidation and carried away by the flowing electrolyte liquid that washes the ions away. By modifying the shape of the non-conductive template, the placement of the electrodes and the path of the flowing electrolyte liquid, and repeating the method if necessary, the method of the present invention can produce shapes of virtually any geometry with superior quality.

In a detailed aspect of a preferred method of the present invention, the power supply supplies the low-voltage, high-density dc current in pulses. The current is passed between the electrode and the surface of the golf club head, in regions where material is to be removed.

In another detailed aspect of a preferred method of the present invention, the liquid containing an electrolyte flows substantially parallel to the surface of the golf club head. By flowing next to the surface of the golf club head, the liquid containing an electrolyte carries away the ionic particles of material, allowing the remaining material of the golf club head to be removed by electro-chemical oxidation.

In yet another detailed aspect of the preferred method, the non-conductive template is not used. Generally, the non-conductive template is placed in connection with the surface of specific areas of the golf club head to prevent the removal of golf club head material from those areas with which the template comes into contact. Instead of using the non-conductive template, the path of the liquid containing an electrolyte and the positioning of the electrodes can determine the regions where the golf club head material will be not be removed.

In yet another detailed aspect of the preferred method, the non-mechanical method of removing material is used to remove material from the surface of a striking plate of a golf club head. If a golf club head incorporates a striking plate, the method of the present invention can be used to form the striking plate or any portion of it.

One example of a golf club head design that can be formed using a method of the present invention is a golf club head with a variable thickness profile. An example of a club head with a variable thickness profile is a body having a toe portion, a heel portion, a sole portion, and a crown portion, together defining a front opening. A face insert is disposed in the opening and has a substantially planar striking surface on a first side, a rear surface on a second side, and a periphery for attachment at the opening on the body. This periphery has a top edge, a bottom edge, a first side edge, and a second side edge. The striking surface has a balance point at a central region of the insert and each point on the striking surface has a thickness.

The face insert has a first thickness profile between the balance point and the top edge, a second thickness profile between the balance point and the bottom edge, a third thickness profile between the balance point and the first side edge, and a fourth thickness profile between the balance point and the second side edge. The first, second, third, and fourth thickness profiles similarly have thickness values at first locations encompassing the periphery of the striking surface and including minimum values adjacent the edges. The thickness profiles similarly have thickness values at least 1.5 times the minimum values at second locations between the first locations and the balance point, and the second locations include points having maximum thickness values. The thickness profiles similarly have thickness values at third locations in the central region that are less than the maximum values at the second locations, but greater than the minimum values at the first locations.

The first, second, third, and fourth thickness profiles, in combination, represent a substantially annular region of increased thickness comprising the second locations. The thickness values of the third locations form a reduced thickness region, and an area including the substantially annular region and the reduced thickness region extend about 50% of the distance from the balance point to each of the top and bottom edges and the first and second side edges.

The present invention provides a solution to enable club designers to overcome the problems associated with using the mechanical methods of production described above, by providing a highly accurate, non-mechanical method for producing golf club heads. The present invention also provides a method of making superior quality golf clubs heads that are made of very strong materials or have complex or irregular surfaces or designs.

Other features and advantages of the present invention should become apparent from the following description of the preferred methods, taken in conjunction with the accompanying drawings, which illustrate, by way of example, the principles of the invention.

BRIEF DESCRIPTION OF THE DRAWINGS

FIGS. 14 and 14A are front and side views, respectively, of a rear portion of yet another face insert that could be manufactured using a method of the present invention. FIG. 14A is cross-sectional view of FIG. 14, taken along lines A—A in FIG. 14.

FIGS. 15 and 15A are front and side views, respectively, of the rear portion shown in FIGS. 14 and 14A. FIG. 15A is a cross-sectional view of FIG. 15, taken along lines A—A in FIG. 15.

DETAILED DESCRIPTION OF THE PREFERRED METHODS

Figure 1:
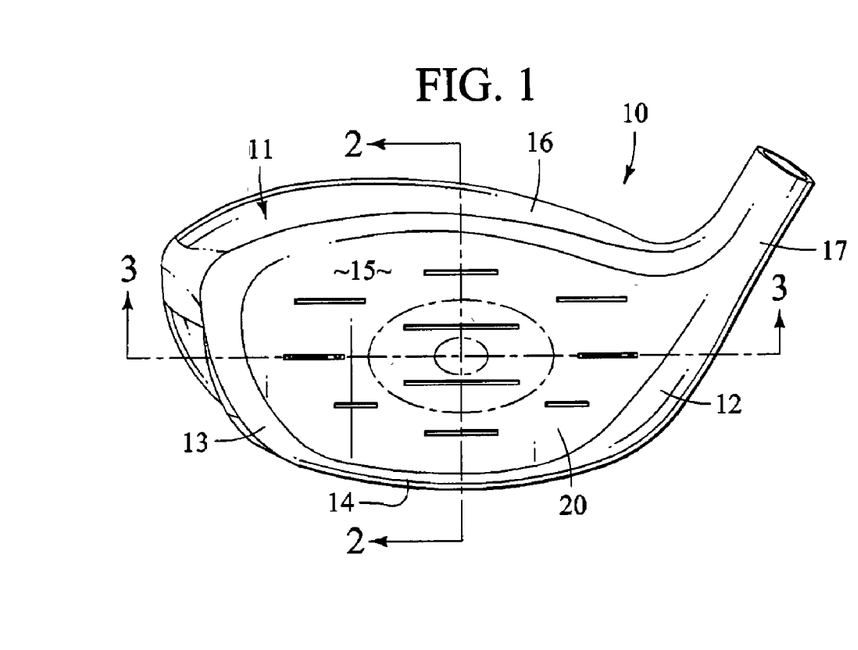
FIG. 1 shows a front view of a golf club head having a variable thickness profile that could be manufactured using a method of the present invention.

FIGS. 1–19 depict examples of several golf club heads and striking plates that could be created using a preferred method of the present invention. With reference to FIG. 1, a club head 10 is shown having a hollow metallic body 11 and a striking or face plate 20. The body comprises a heel portion 12, a toe portion 13, a sole portion 14, and a crown portion 16, which cooperate to define an opening (not shown) that receives the striking plate. The striking plate is shown in greater detail in FIGS. 2–4. The club head is normally connected to a shaft (not shown) by a hosel 17 that is integrally formed with the body The club head is typically manufactured such that the body, including the heel portion, toe portion, sole portion, crown portion and hosel, are integrally formed, and the striking plate, having a striking face 15, is fixedly attached by means known in the art. However, the various portions of the body may be separately molded, cast, forged, or otherwise manufactured by means known in the art, and fixedly attached to form the body.

Figure 4:
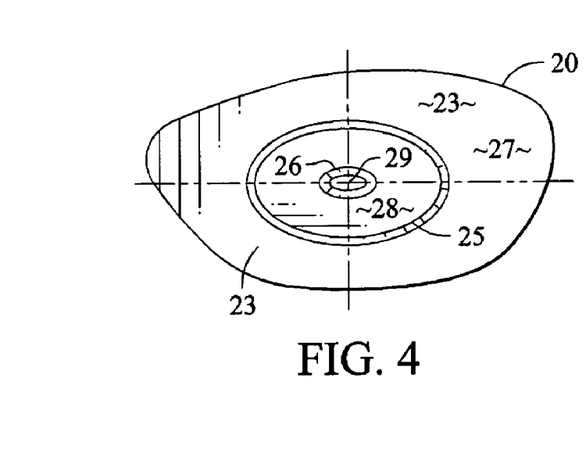
FIG. 4 is a rear elevational view of an insert corresponding to the golf club head of FIG. 1.

FIG. 4 shows the rear surface 23 of the striking plate formed from stainless steel. The rear surface comprises an outer rear surface 27 and an inner rear surface 29. Between the outer rear surface and the inner rear surface is a raised surface 28. The raised surface forms an area that is substantially elliptical. Proximate the raised surface are an outer shoulder 25 and an inner shoulder 26 that form a transition between the raised surface and the outer rear surface and the inner rear surface. The raised surface and the shoulders 25 & 26 cooperate to form an elliptical, washer-shaped projection that extends rearward toward the inside of the club head cavity.

Figure 5:
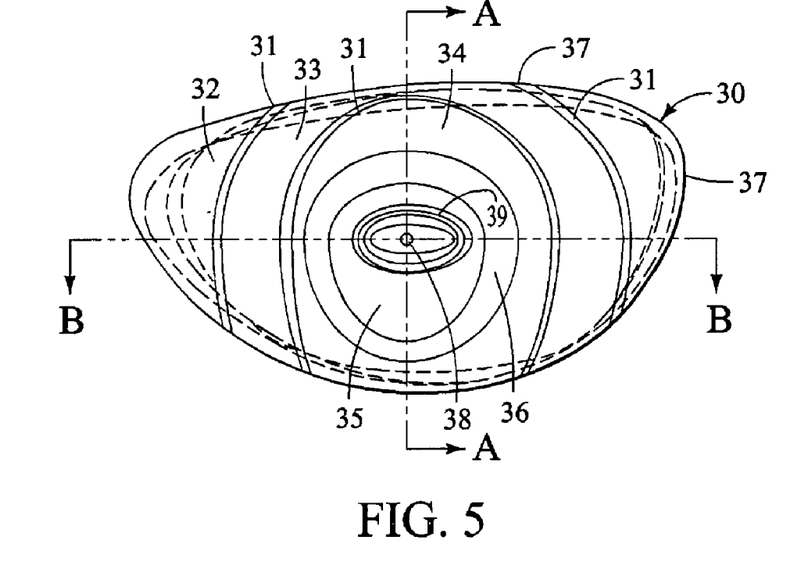
FIG. 5 is a rear elevational view of another face insert that could be manufactured using a method of the present invention.
Figure 5A:
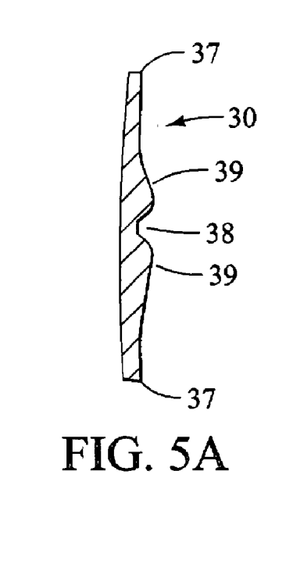
FIG. 5A is a cross-sectional view of the face insert of FIG. 5, taken along lines A—A in FIG. 5.
Figure 5B:
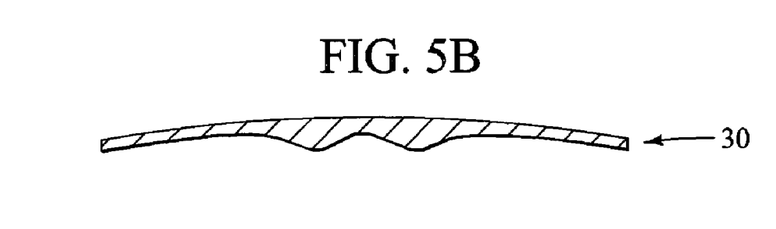
FIG. 5B is a cross-sectional view of the face insert of FIG. 5, taken along lines B—B in FIG. 5.

An alternative striking plate 30 may be created as a unitary structure, as shown in FIG. 5. As indicated by the topographical lines 31 showing the varying thicknesses (32, 33, 34, 35, 36), a method of the present invention provides the opportunity to form relatively complex surfaces in a fairly simple process. In this example, the thickness ranges from about 1.6 mm near the periphery 37 of the plate, to about 1.9 mm radially inward from the periphery, toward a balance point at about the center 38 of the striking plate. The thickness increases to about 2.5 mm further inward, up to a maximum of about 4.8 mm in a generally elliptical portion 39, surrounding a 2.5 mm thickness region at the center 38.

Figure 2:
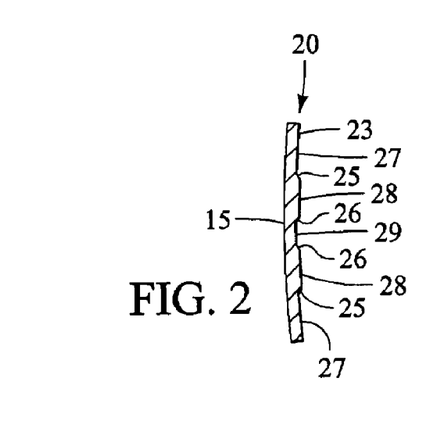
FIG. 2 is a cross-sectional view of the golf club head of FIG. 1, taken along lines 2—2 in FIG. 1.
Figure 3:
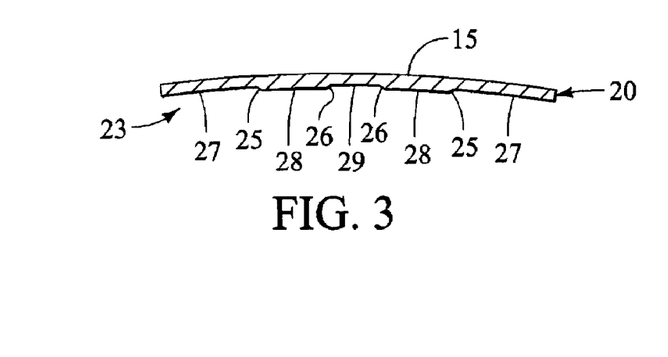
FIG. 3 is a cross-sectional view of the golf club head of FIG. 1, taken along lines 3—3 in FIG. 1.
Figure 6:
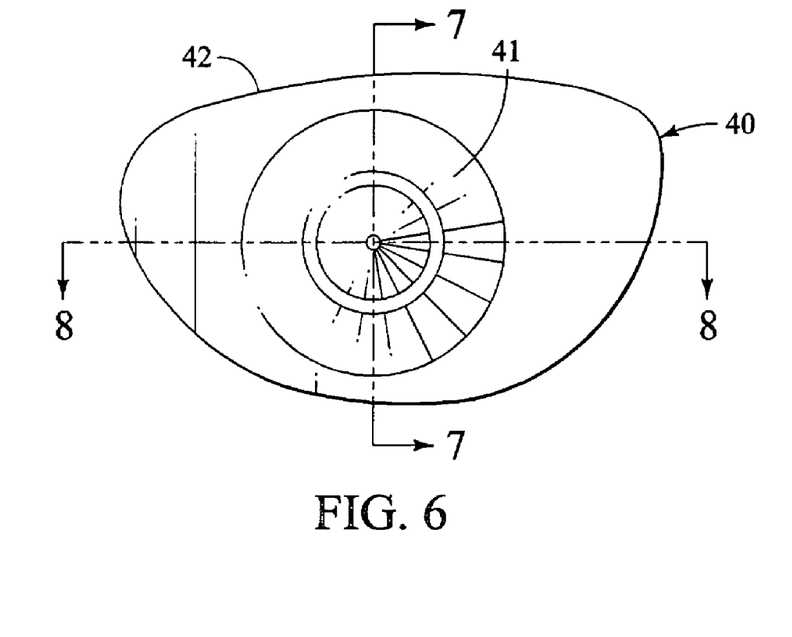
FIG. 6 is a rear elevational view of yet another face insert that could be manufactured using a method of the present invention.
Figure 7:
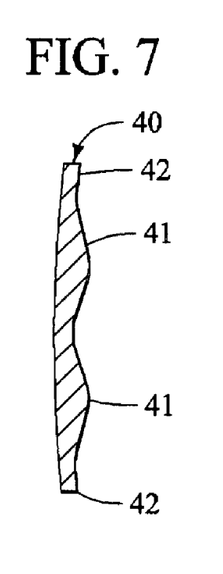
FIG. 7 is a cross-sectional view of the face insert of FIG. 6, taken along lines 7—7 in FIG. 6.
Figure 8:
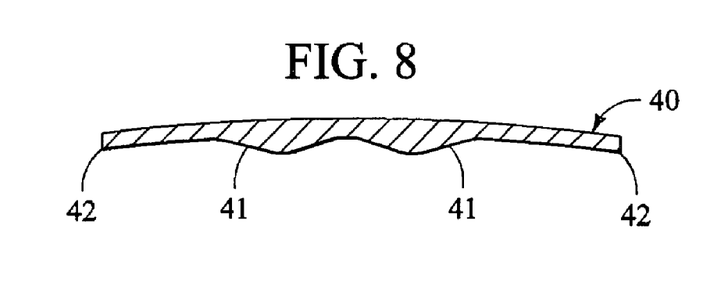
FIG. 8 is a cross-sectional view of the face insert of FIG. 6, taken along lines 8—8 in FIG. 6.

FIGS. 6–8 are similar to FIGS. 2–4 in that the thickness variation of the rear of the striking plate 40 of FIGS. 6–8 is more symmetrical than that shown in FIG. 5. As shown in FIG. 6, the shape of the generally annular region 41 of increased thickness is round, while in FIG. 2 the annular region of the raised surface was more elliptical. In addition, the annular region shown in FIGS. 7 and 8 is somewhat thicker and more gradual in slope than the region of maximum thickness of the raised surface shown in FIGS. 2 and 3, in which much of the raised surface is substantially flat.

The face portions represented in FIGS. 2–8 share a characteristic that a substantial increase in thickness occurs within about 75% of the distance from the center (e.g., 29, 38) toward the peripheral edges of the plates (e.g., 37). Preferably, the thickness increase occurs within about 50% of the distance from the center to the periphery. Also, the annular regions (e.g., 41) comprise thicknesses that are at least 50% greater than the minimum thickness found at the outermost periphery (42 in FIGS. 6–8) and cover an area at least about 12% of the total area of the striking plate 40. Preferably, the annular region 41 covers an area at least about 15%, and most preferably at least about 20%, of the total area of the striking plate.

For a given material, a point on the club face can be considered beam-like in cross-section, and its bending stiffness at a given location on the face can be calculated as a cubed function of its thickness, $h^3$. That is, $EI=f(h^3)$, where E is the Young's Modulus and I is the inertia. Thus, if a first point on the face has a thickness of 2 mm and a second point has a thickness of 3 mm, then the second point is 1.5 times thicker and has a stiffness that is 3.375 times that of the first point, or:

$$(3 \text{ mm})^3/(2 \text{ mm})^3=(1.5)^3=3.375$$

Figure 9:
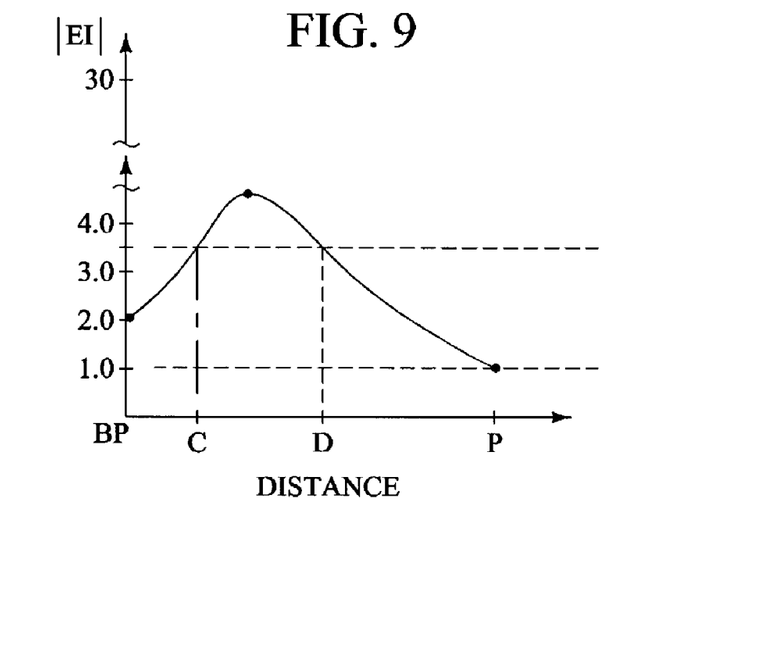
FIG. 9 is a graph showing the stiffness profile of the face insert of FIG. 5, from the face's balance point (BP) to a peripheral point (P).

The stiffness values in the central region of the face containing the sweet spot are at least higher than the minimum stiffness found at a peripheral point (P) at the outermost region. However, the maximum stiffness of the face is provided a distance radially outward from the sweet spot. The central region does include a locally minimum stiffness value, which is still greater than the lowest stiffness found at the outermost region. Referring to FIG. 9, the central region extends from BP to C, while the region including the maximum stiffness extends between C and D. The outer periphery of the face extends from D to P.

Thus, there is a stiffness profile with varying stiffness values corresponding to distances located radially outward from the sweet spot toward the periphery of the face. The striking surface of the face may be represented by quadrants, defined by central axes formed from a substantially vertical plane and a substantially horizontal plane that each include the balance point of the face. At least one stiffness profile is included in each quadrant, extending generally radially from the balance point, and may or may not coincide with one of the central axes.

While a particular stiffness profile found along any radial line may or may not be repeated elsewhere on the face, each profile includes at least the minimum value at the greatest radial distance from the sweet spot, and the maximum value somewhere between the minimum value and the sweet spot. A generally annular region formed around the central region includes the maximum stiffness values, which generally forms an ellipse or circle, or the like, as well as stiffness values which are generally higher than those found in either the central region or the outermost region of the face. A boundary stiffness value to differentiate this annular region is at least about 3.5 times the minimum stiffness values.

Figure 10:
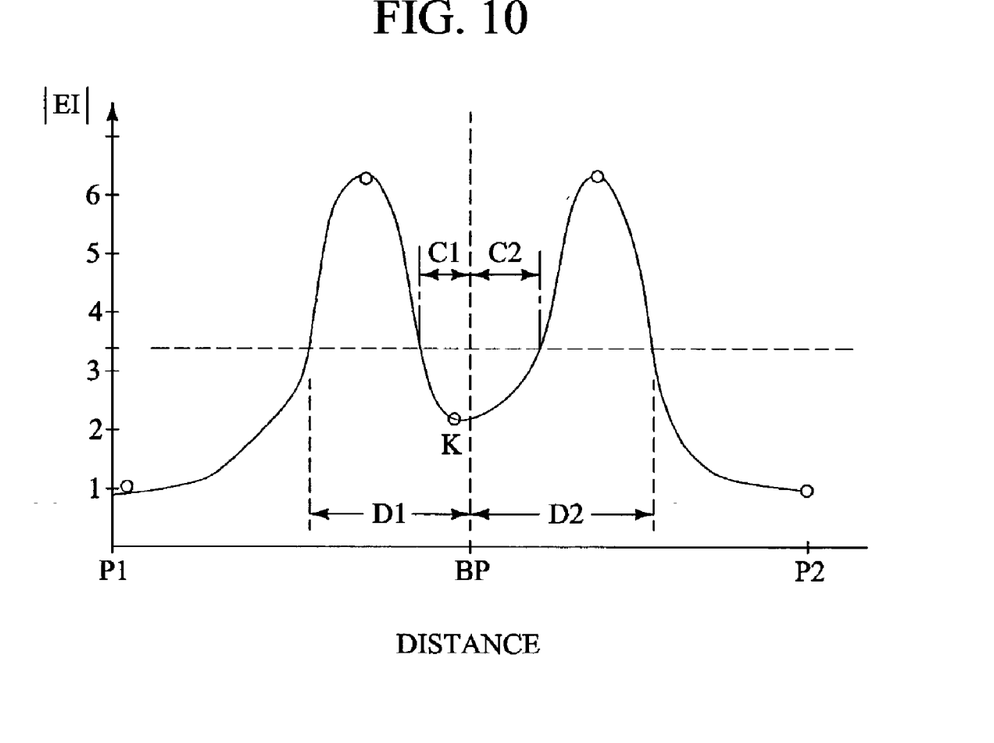
FIG. 10 is a graph showing the two stiffness profiles of the face insert of FIG. 5, extending from a balance point and including a local minimum of a central region that is located along the profile extending toward peripheral points $P_1$ and $P_2$

The total central region comprising all of the possible stiffness profiles of the striking plate is in general reduced in stiffness from the surrounding, substantially annular region. The local minimum stiffness point K found in the central region may either be at the sweet spot and, thus, common to any profile taken, or this point may be offset slightly and included only with a specific stiffness profile, as shown in FIG. 10. Here, two stiffness profiles are shown and the length from BP to C1 is slightly less than the length from BP to C2; the lengths D1 and D2 from BP may differ, however, both extend no more than about halfway to their respective peripheral points P1 and P2.

The specific stiffness profiles, taken along any of the radial lines from the sweet spot, are preferably gradual and continuous, with each region delineated by the boundary values. However, as formed using specific thicknesses, the desired stiffness profiles may be achieved using, for example, constant thickness values having abrupt changes between or within stiffness regions, such as stepped and discontinuous sections. Or, the thicknesses may include smoothly changing and continuous thicknesses, such as chamfered sections. Also, the thicknesses may include extremely variable thicknesses within a region that may be observed as rough or sharp textured surfaces or softer, undulating surfaces. Any combination of these types of thickness profiles may be employed.

Figures 11, 13:
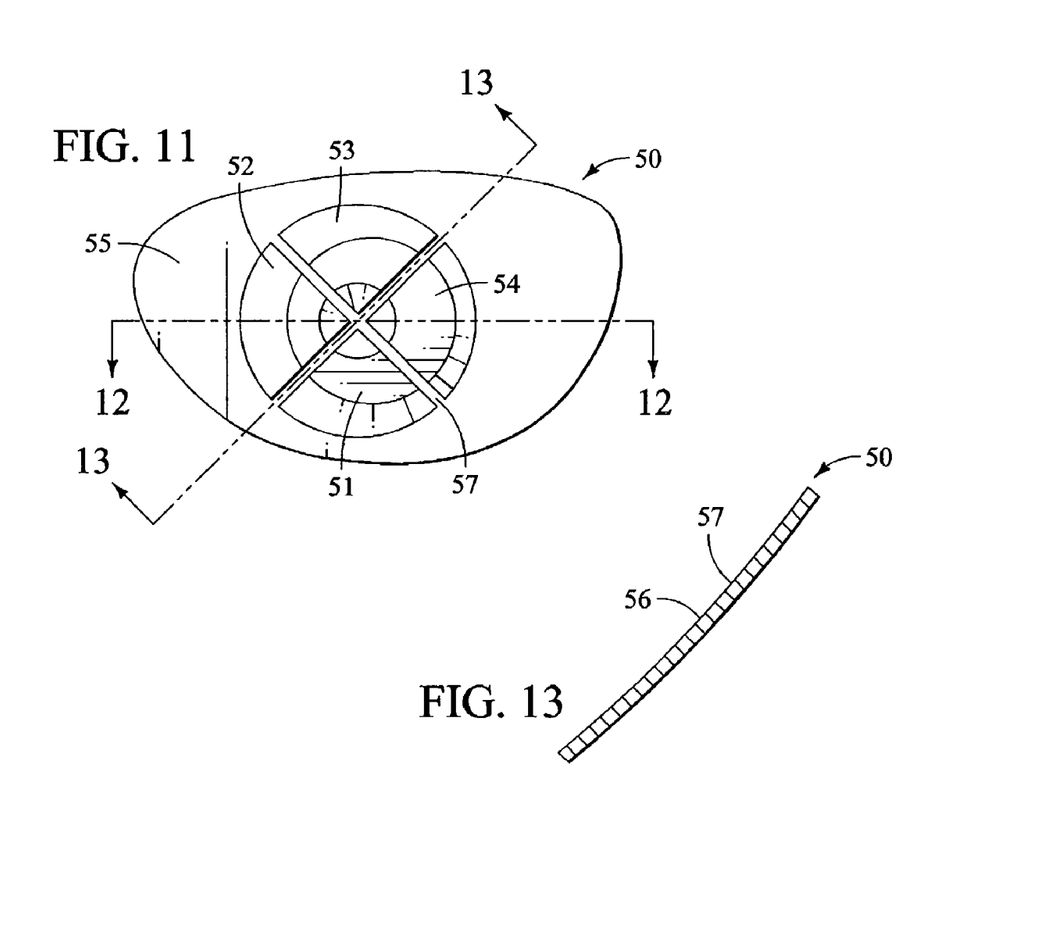
FIG. 11 is a rear elevational view of yet another face insert that could be manufactured using a method of the present invention. The face insert has discontinuous thicknesses that is also asymmetric, at least as viewed along a line between the heel and toe ends of the insert.
FIG. 13 is a cross-sectional view of the face insert of FIG. 11, taken along lines 13—13 in FIG. 11.
Figure 12:
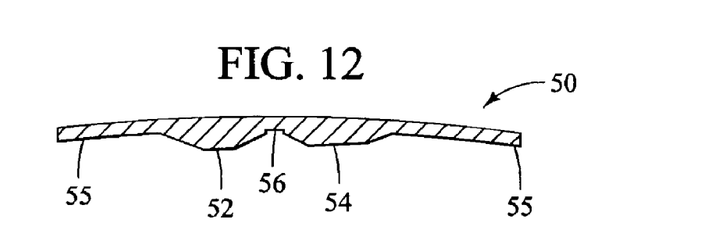
FIG. 12 is a cross-sectional view of the face insert of FIG. 11, taken along lines 12—12 in FIG. 11.

FIGS. 11–13 show a striking face 50 having an alternative thickness pattern that could be manufactured using a method of the present invention. Thickness quadrants have been formed and are divided by an X-shaped section 57 separating individual quadrants (51, 52, 53, 54) that has the same thickness as a periphery 55. This X-shaped section is centered at the balance point 56. The separate regions of increased thickness shown as quadrants (51, 52, 53, 54) are not symmetric about the balance point, as shown in FIG. 12. The quadrant toward the left 52 has a maximum thickness greater than the maximum thickness of the quadrant toward the right 54 of the balance point.

The club heads described herein may be hollow or filled, have volumes greater than 300 cc or less than about 250 cc, and may comprise unitary or multi-piece bodies. In addition, the face portion may comprise an extension over one or more of the junctions with the top, bottom, toe and heel junctions, with or without a hosel formation. Alternatively, it may be desirable to form a substantially unitary head without a separate striking plate by using a method of the present invention.

Figure 14:
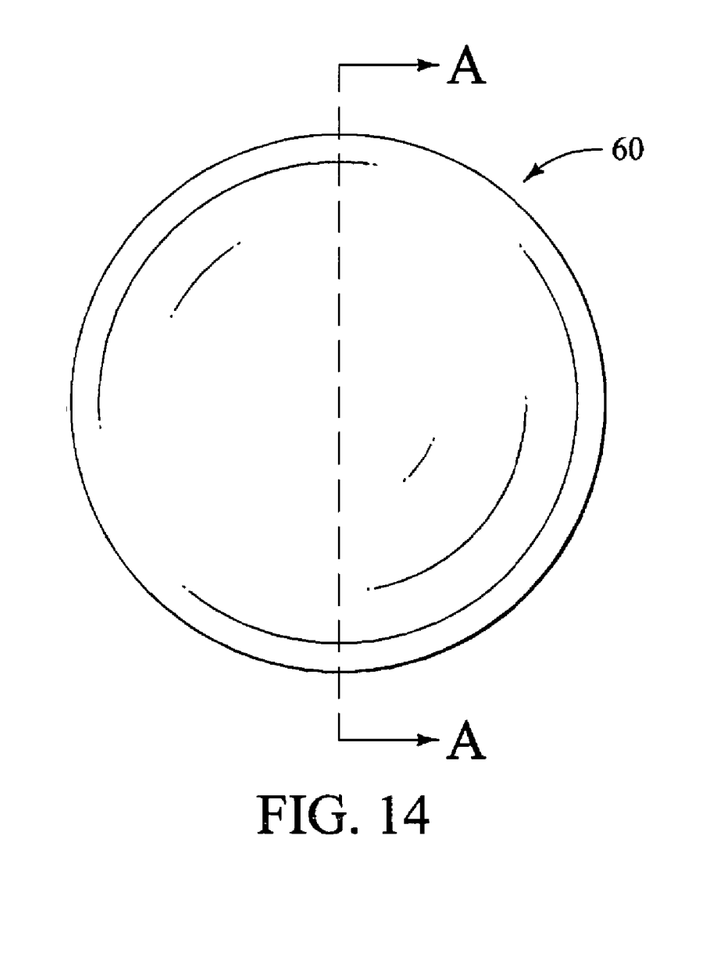
Figure 14A:
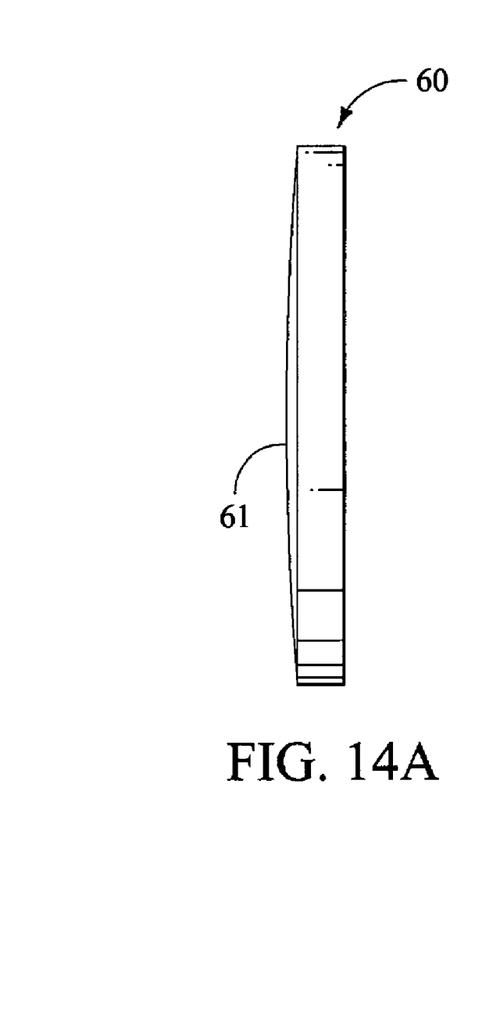
Figure 15:
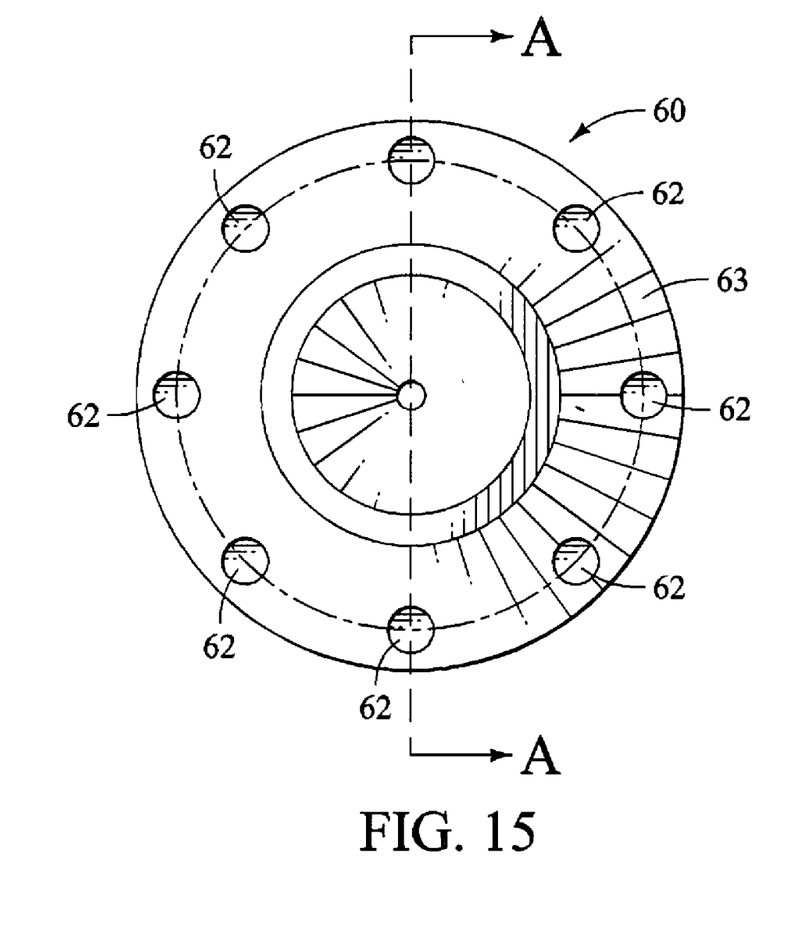
Figure 15A:
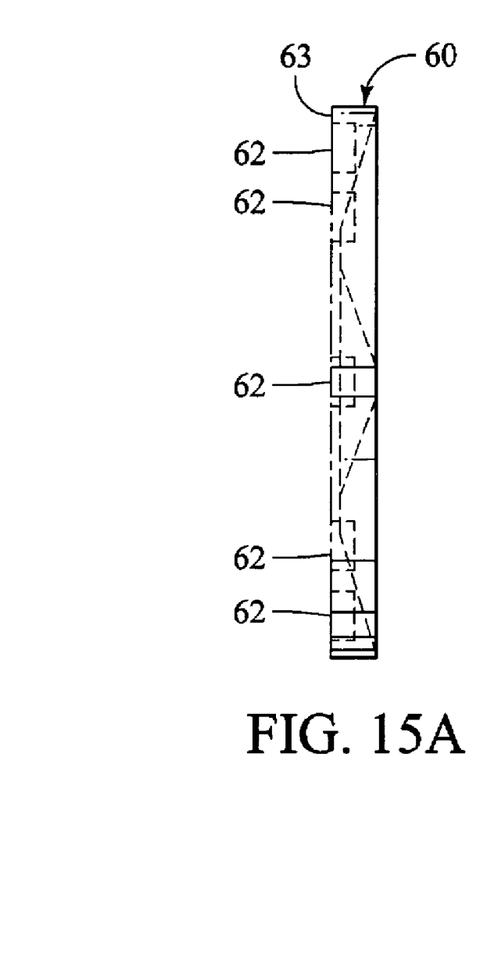
Figure 16:
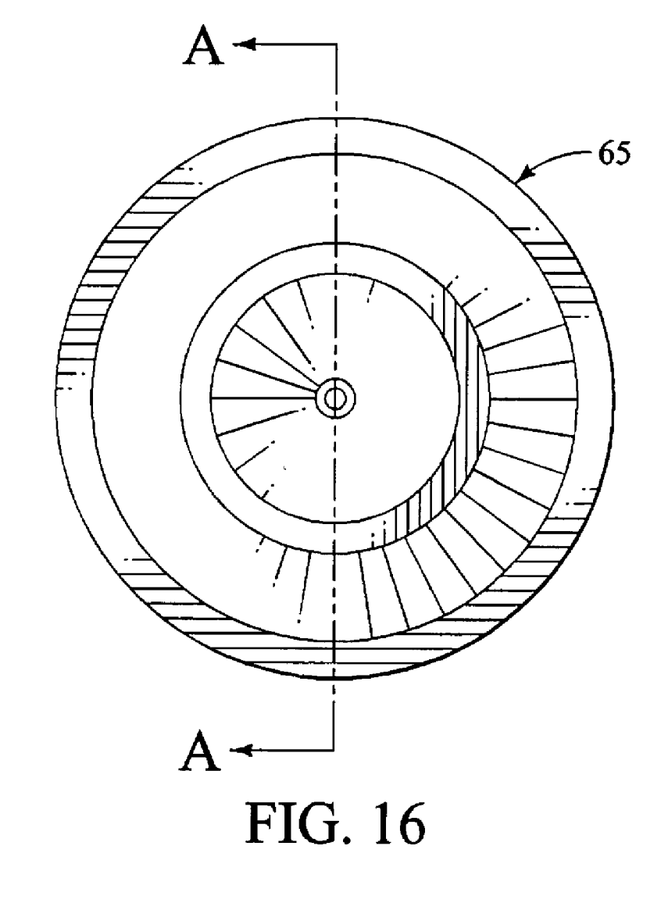
FIGS. 16 and 16A are rear elevational and cross-sectional views of the rear portion of FIG. 14, with final thicknesses.
Figure 16A:
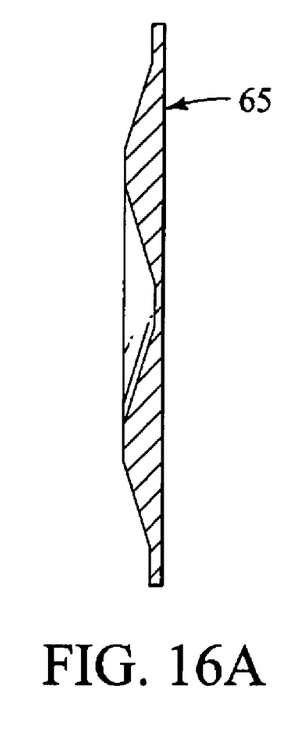

FIGS. 14–16 show the rear portion of a striking plate in a sequence of configurations for attachment. Specifically, FIGS. 14 and 14A show a disk 60 approximately 38 mm in diameter and approximately 3 mm in thickness having a slightly convex surface formed on one side 61. FIGS. 15 and 15A show recesses or drive holes 62 formed around a periphery 63 of the disk, with the depths of the recesses limited by the final thickness of the surface after attachment. A device (not shown) for the inertia welding holds the disk at the recesses until welding is completed. The final shaping of the rear of the striking plate can be achieved by using a method of the present invention, with a final shape 65 shown in FIGS. 16 and 16A.

Figure 17:
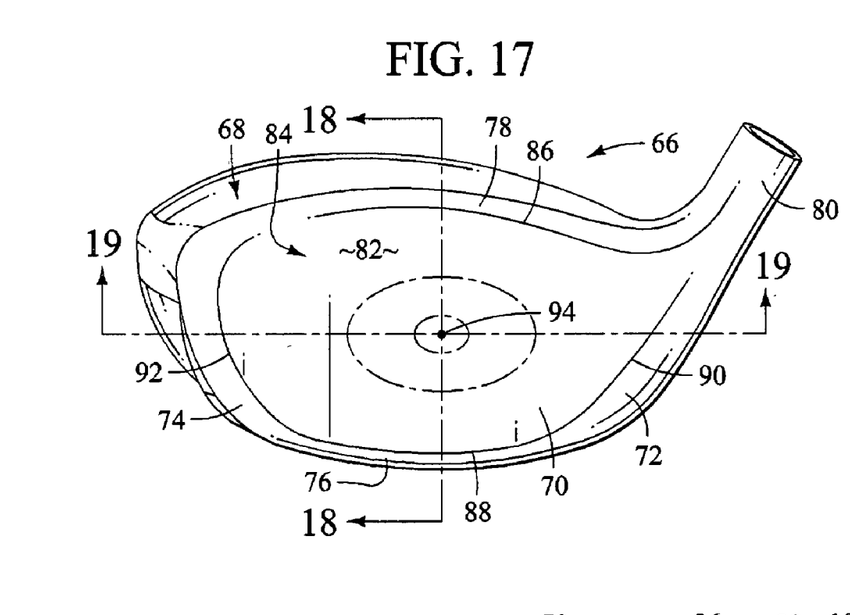
FIG. 17 is a perspective view of yet another golf club head that could be manufactured using a method of the present invention.

Another alternative golf club head 66 that can be manufactured using a method of the present invention is depicted in FIG. 17. The club head includes a hollow metallic body 68 and a striking plate 70. The body includes a heel portion 72, a toe portion 74, a sole portion 76, and a crown portion 78, that cooperate to define an opening sized to receive the striking plate. The striking plate is shown in greater detail in FIGS. 18–19. The club head is normally connected to a shaft (not shown) by a hosel 80 that is integrally formed with the body. The club head preferably is manufactured such that the body, including the heel portion, toe portion, sole portion, crown portion and hosel, are integrally formed. The striking plate, having a generally planar striking surface 82, is fixedly attached by means known in the art. However, the various portions of the body may be manufactured by the method of the present invention or by any means known in the art, and fixedly attached to form the body.

Referring again to FIG. 17, the striking plate has the generally planar striking surface on a front side, a rear surface on a rear side, and a periphery for attachment at the opening on the body. Each point on the striking surface has a thickness and the striking surface has a total area. The striking plate has a first thickness profile between the balance point and the top edge 86, a second thickness profile between the balance point and the bottom edge 88, a third thickness profile between the balance point and the first side edge 90, and a fourth thickness profile between the balance point and the second side edge 92. The first, second, third and fourth thickness profiles each have first, second and third locations with varying thickness values. The first and second thickness profiles have thickness values at the second locations that are less than the maximum values of the third and fourth thickness profiles at the second locations, but greater than minimum values of the first, second, third, and fourth thickness profiles at the first locations.

Figure 18:
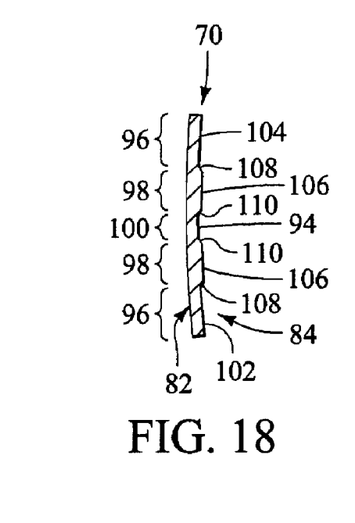
FIG. 18 is a detailed cross-sectional view of the striking plate, taken along lines 18—18 of FIG. 17.

FIG. 18 is a detailed cross-sectional view of striking plate, taken along lines 18—18 of FIG. 17. Referring to FIG. 18, the first, second, third, and fourth thickness profiles of striking plate all have thickness values at first locations 96 encompassing the periphery of the striking plate and including minimum values adjacent the edges. The first, second, third, and fourth thickness profiles also all have thickness values at second locations 98 positioned between the first locations and the balance point 94. The first and second thickness profiles have thickness values at the second locations that are less than the maximum values of the third and fourth thickness profiles at the second locations, but greater than minimum values of the first, second, third, and fourth thickness profiles at the first locations. The first, second, third, and fourth thickness profiles have thickness values at the third locations 100 in the central region that are less than the maximum values of the third and fourth thickness profiles at the second locations, but greater than the minimum values of the first, second, third, and fourth thickness profiles at the first locations.

The rear surface 84 of the striking plate includes an outer rear surface 102 and an inner rear surface 104. A generally ring-shaped raised surface 106 is formed between the outer surface and the inner surface. Proximate the raised surfaces are an outer shoulder 108 and an inner shoulder 110 that form transitions between the raised surface and the respective outer surface and inner surface. The raised surfaces and the outer and inner shoulders cooperate to form a generally ring-shaped projection extending rearward toward the inside of the club head cavity.

Figure 19:
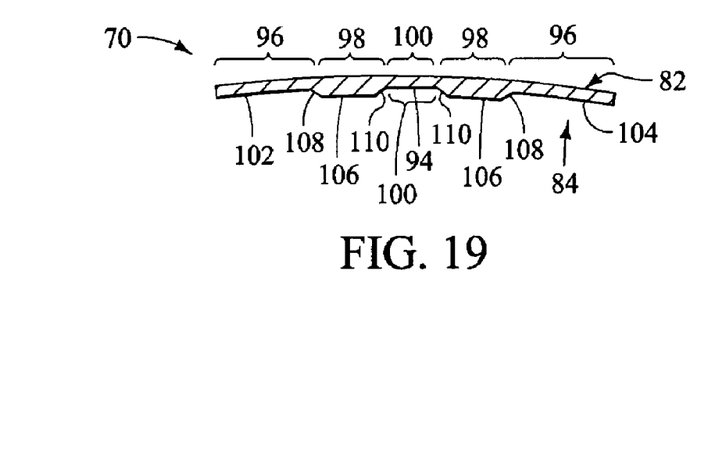
FIG. 19 is a detailed cross-sectional view of the striking plate, taken along lines 19—19 of FIG. 17, showing the third and fourth thickness profiles at the second locations with maximum values.

FIG. 19 is a detailed cross-sectional view of the striking plate taken along lines 19—19 of FIG. 17. Referring to FIG. 19, the third and fourth thickness profiles have thickness values that are at least 1.5 times the minimum values and include points with the maximum values at the second locations. The first, second, third, and fourth thickness profiles have thickness values at the third locations in the central region that are less than the maximum values of the third and fourth thickness profiles at the second locations, but greater than the minimum values of the first, second, third, and fourth thickness profiles at the first locations. The rear surface of the striking plate includes an outer rear surface and an inner rear surface with a generally ring-shaped raised surface defined between them. An outer shoulder and an inner shoulder form transitions between the raised surfaces and the respective outer surface and inner surface. The raised surface and the shoulders cooperate to form a generally ring-shaped projection extending rearward toward the inside of the club head cavity. The maximum thickness values of the generally ring-shaped projection occur at the second locations of the third and fourth thickness profiles.

Figure 20:
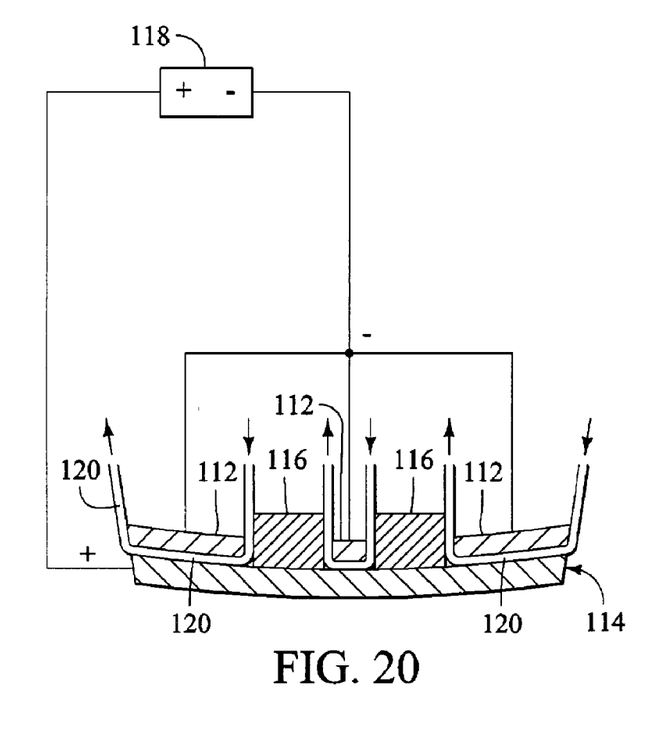
FIG. 20 is a schematic layout of an apparatus that can be used to implement a preferred method for non-mechanically removing material from a surface of a golf club head striking plate in accordance with the present invention.

The examples of golf club heads provided above demonstrate the need for an improved method for producing superior quality golf clubs heads that incorporate complex or irregular surfaces or designs and are made out of very strong materials. The present invention provides a highly accurate, non-mechanical method for producing golf club heads that overcomes the problems associated with using mechanical methods discussed above. The method of the present invention can be used to produce superior quality golf club heads that incorporate complex or irregular surfaces or designs and are made out of very strong materials. Referring now to the drawings, and particularly to FIG. 20, in one preferred method, a group of electrodes 112 are positioned close to a golf club head striking plate 114 where material is to be removed, and a non-conductive template 116 is shaped to contact the surface of the striking plate 114 only where material is not to be removed. A power supply 118 provides a low-voltage, high-density dc current that is passed between the electrodes 112 and the surface of striking plate 114 in the region where material is to be removed. A liquid 120 containing an electrolyte is made to flow between the electrodes 112 and the surface of the exposed area of the striking plate 114. The flowing liquid 120 comes into contact with the surface of the exposed areas of the striking plate 114 where material is to be removed, as determined by the non-conductive template 116 and the path of the flowing liquid 120.

The high-density dc current passing between the electrodes 112 and the surface of the striking plate 114 results in the electrodes 112 having an overall negative charge and the striking plate 114 having an overall positive charge. The negatively charged electrolytes in the flowing liquid 120 attract the positively charged molecules of the surface of the striking plate 114. The material of the striking plate 114 is removed from the striking plate 114 by electro-chemical oxidation and carried away by the flowing liquid 120, which washes the ions away. This process can produce shapes of virtually any geometry by using a non-conductive template 116 that is carefully manufactured to conform to the shape and size of the machining operation required.

Figure 21:
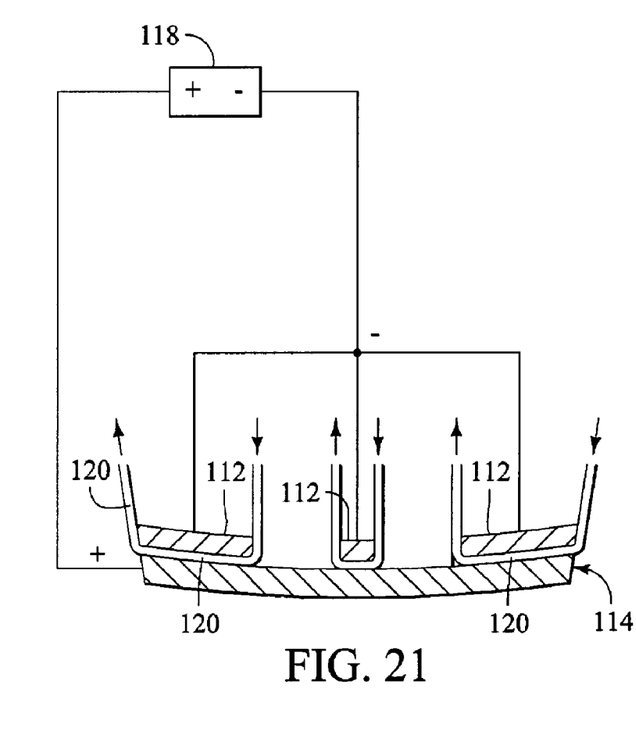
FIG. 21 is a schematic layout of an apparatus that can be used to implement an alternative preferred method for non-mechanically removing material from a surface of a golf club head striking plate in accordance with the present invention. This method differs from that of FIG. 20 in that a non-conductive template is not provided.

FIG. 21 depicts an apparatus that can be used to implement an alternative preferred method for removing material from the striking plate 114 of a golf club head. This alternative method omits the use of the non-conductive template 116, shown in FIG. 20, and, instead, uses the path of flowing liquid 120 and the location of the electrodes 112 to determine where the material of the striking plate 114 will be removed. FIG. 21 depicts an apparatus that can be used to implement the alternative method of the present invention. In FIG. 21, a group of electrodes 112 are positioned close to a golf club head striking plate 114 where material is to be removed. A power supply 118 provides a low-voltage, high-density dc current that is passed between the electrodes 112 and the surface of striking plate 114 in the region where material is to be removed. A liquid 120 containing an electrolyte is made to flow between the electrodes 112 and the surface of the exposed areas of the striking plate 114 where material is to be removed. The high-density dc current passing between the electrode 112 and the surface of the striking plate 114 results in the electrode 112 having an overall negative charge and the striking plate 114 having an overall positive charge. The negatively charged electrolytes in the flowing liquid 120 attract the positively charged molecules of the surface of the striking plate 114. The material of the striking plate 112 is then removed by electro-chemical oxidation and carried away by the flowing liquid 120, which washes the ions away.

The examples of golf club heads and striking plates described herein and shown in FIGS. 1–21 are for illustrative purposes only and are not intended to limit the scope of the present invention. Therefore, it should be appreciated that the present invention is not limited to methods for removing material from the golf club heads and striking plates of a golf club head described herein and shown in FIGS. 1–21, and includes, but is not limited to, methods for removing material from any surface of a golf club head.

It should be evident from the drawings and the discussion above that the present invention provides a highly accurate, non-mechanical method of producing golf club heads without the additional cost or delay associated with using mechanical methods.

Although the invention has been described in detail with reference to the presently preferred methods, those of ordinary skill in the art will appreciate that various modifications can be made without departing from the invention. Accordingly, the invention is defined only by the following claims.

We claim:

1. A method of manufacturing a striking plate of a golf club head, the method comprising:
   providing a striking plate, the striking plate having a striking surface and a rear surface opposed to the striking surface, the rear surface having a first surface portion from which a designated amount of material is to be removed;
   placing at least one electrode in close proximity to the first surface portion of the striking plate;
   flowing a liquid containing an electrolyte between the first surface portion and the electrode; and
   applying a low voltage between the first surface portion and the electrode, wherein the electrode has an overall negative charge and the golf club head has an overall positive charge, such that a pulsed high-density DC current passes between the electrode and the first surface portion;
   wherein this results in negatively charged electrolytes in the liquid attracting positively charged molecules of the first surface portion, such that the designated amount of material from the first surface portion is removed by electro-chemical oxidation and carried away by the liquid flow.

2. A method as in claim 1, wherein the steps of providing, placing, flowing, and applying are repeated.

3. A method as in claim 1, wherein the step of flowing causes the liquid to flow substantially parallel to the rear surface of the striking plate.

4. A method as in claim 1, further comprising:
   providing a non-conductive template; and
   attaching the non-conductive template to the rear surface of the striking plate, wherein the non-conductive template is adapted to contact the rear surface only where material of the striking plate is not to be removed.

5. A method as in claim 1, wherein the designated amount of material is removed from the first surface portion such that the striking plate has a minimum thickness at an outermost periphery of the striking plate and a maximum thickness within a central region of the striking plate.

* * * * *

UNITED STATES PATENT AND TRADEMARK OFFICE
CERTIFICATE OF CORRECTION

PATENT NO.        : 7,166,207 B2
APPLICATION NO.   : 10/302332
DATED             : January 23, 2007
INVENTOR(S)       : Bing-Ling Chao et al.

It is certified that error appears in the above-identified patent and that said Letters Patent is hereby corrected as shown below:

Column 3, line 30, "electrochemical" should be -- electro-chemical --.

Column 6, line 2, "body" should be -- body. --.

Signed and Sealed this

Seventeenth Day of April, 2007

JON W. DUDAS
*Director of the United States Patent and Trademark Office*